United States Patent
Kwon

(10) Patent No.: US 10,476,561 B2
(45) Date of Patent: *Nov. 12, 2019

(54) APPARATUS AND METHODS FOR MULTI-USER SIMULTANEOUS TRANSMISSION

(71) Applicant: NEWRACOM, Inc., Lake Forest, CA (US)

(72) Inventor: Young Hoon Kwon, Laguna Niguel, CA (US)

(73) Assignee: NEWRACOM, INC., Lake Forest, CA (US)

(*) Notice: Subject to any disclaimer, the term of this patent is extended or adjusted under 35 U.S.C. 154(b) by 14 days.

This patent is subject to a terminal disclaimer.

(21) Appl. No.: 15/833,930

(22) Filed: Dec. 6, 2017

(65) Prior Publication Data

US 2018/0097549 A1    Apr. 5, 2018

Related U.S. Application Data

(63) Continuation of application No. 15/045,161, filed on Feb. 16, 2016, now Pat. No. 9,866,290.

(Continued)

(51) Int. Cl.
*H04W 4/00* (2018.01)
*H04B 7/0452* (2017.01)
(Continued)

(52) U.S. Cl.
CPC ............ *H04B 7/0452* (2013.01); *H04L 1/00* (2013.01); *H04L 27/2607* (2013.01);
(Continued)

(58) Field of Classification Search
CPC ..... H04B 7/0452; H04L 1/00; H04L 27/2607; H04W 72/1289; H04W 84/12
(Continued)

(56) References Cited

U.S. PATENT DOCUMENTS

2008/0165893 A1   7/2008  Malladi et al.
2014/0219199 A1*  8/2014  Ji .......................... H04W 88/08
                                                          370/329
(Continued)

OTHER PUBLICATIONS

IEEE P802.11ah/D5.0: "Part 11: Wireless LAN Medium Access Control (MAC) and Physical Layer (PHY) Specifications, Amendment 2: Sub 1 GHz License Exempt Operation," IEEE Draft Standard for Information technology—Telecommunications and information exchange between systems, Local and metropolitan area networks—Specific requirements, Mar. 2015, 632 pages.

(Continued)

*Primary Examiner* — Mang Hang Yeung
(74) *Attorney, Agent, or Firm* — NDWE LLP

(57) ABSTRACT

The embodiments provide a method implemented by a first station (STA) for transmitting a frame to an Access Point (AP) as part of an uplink multi-user simultaneous transmission. The method avoids unintentional beamforming at the AP. The method includes receiving a first frame from the AP, where the first frame includes scheduling information for scheduling a simultaneous uplink transmission for the first STA and one or more other STAs, generating a second frame having a common part and a user-specific part, where the second frame is to be transmitted simultaneously with other frames according to the scheduling information, determining a cyclic shift value to be applied to the common part, where the cyclic shift value is determined to be different from one or more cyclic shift values to be applied by each of the other STAs, applying the cyclic shift value to the common part and transmitting the second frame to the AP.

16 Claims, 8 Drawing Sheets

Related U.S. Application Data

(60) Provisional application No. 62/117,135, filed on Feb. 17, 2015.

(51) Int. Cl.
*H04L 1/00* (2006.01)
*H04W 72/12* (2009.01)
*H04L 27/26* (2006.01)
*H04W 84/12* (2009.01)
*H04L 1/18* (2006.01)

(52) U.S. Cl.
CPC ....... *H04W 72/1289* (2013.01); *H04L 1/1854* (2013.01); *H04W 84/12* (2013.01)

(58) Field of Classification Search
USPC ........................................................ 370/329
See application file for complete search history.

(56) References Cited

U.S. PATENT DOCUMENTS

| | | | | |
|---|---|---|---|---|
| 2015/0319633 A1* | 11/2015 | Ji | .................. | H04B 7/0452 370/252 |
| 2016/0037550 A1 | 2/2016 | Barabell et al. | | |
| 2016/0255645 A1* | 9/2016 | Li | .................. | H04L 5/0023 370/329 |

OTHER PUBLICATIONS

IEEE Std 802.11-2012: "Part 11: Wireless LAN Medium Access Control (MAC) and Physical Layer (PHY) Specifications," IEEE Standard for Information technology—Telecommunications and information exchange between systems, Local and metropolitan area networks—Specific requirements, Mar. 29, 2012, 2793 pages.

IEEE Std 802.11ac-2013 "Part 11: Wireless LAN Medium Access Control (MAC) and Physical Layer (PHY) Specifications, Amendment 4: Enhancements for Very High Throughput for Operation in Bands below 6 GHz," IEEE Standard for Information technology—Telecommunications and information exchange between systems, Local and metropolitan area networks—Specific requirements, Dec. 18, 2013, 425 pages.

Non-Final Office Action from U.S. Appl. No. 15/045,161, dated May 24, 2017, 15 pages.

Notice of Allowance from U.S. Appl. No. 15/045,161, dated Sep. 7, 2017, 7 pages.

* cited by examiner

APPARATUS AND METHODS FOR MULTI-USER SIMULTANEOUS TRANSMISSION

CROSS-REFERENCE TO RELATED APPLICATIONS

This application is a continuation of U.S. application Ser. No. 15/045,161, filed Feb. 16, 2016, which application claims the benefit of U.S. Provisional Application No. 62/117,135, filed Feb. 17, 2015, which are hereby incorporated by reference.

FIELD OF INVENTION

The embodiments of the invention are related to the field of Wireless Local Area Network (WLAN) operation. More specifically, the embodiments of the invention relate to a method and apparatus for avoiding unintentional beamforming during a multi-user simultaneous transmission. Other embodiments are also disclosed.

BACKGROUND

Institute of Electrical and Electronics Engineers (IEEE) 802.11 is a set of physical and Media Access Control (MAC) specifications for implementing wireless local area network (WLAN) communications. These specifications provide the basis for wireless network products using the Wi-Fi brand managed and defined by the Wi-Fi Alliance. The specifications define the use of the 2.400-2.500 GHz as well as the 4.915-5.825 GHz bands. These spectrum bands are commonly referred to as the 2.4 GHz and 5 GHz bands. Each spectrum is subdivided into channels with a center frequency and bandwidth. The 2.4 GHz band is divided into 14 channels spaced 5 MHz apart, though some countries regulate the availability of these channels. The 5 GHz band is more heavily regulated than the 2.4 GHz band and the spacing of channels varies across the spectrum with a minimum of a 5 MHz spacing dependent on the regulations of the respective country or territory.

WLAN devices are currently being deployed in diverse environments. These environments are characterized by the existence of many Access Points (APs) and non-AP stations (STAs) in geographically limited areas. Increased interference from neighboring devices gives rise to performance degradation. Additionally, WLAN devices are increasingly required to support a variety of applications such as video, cloud access, and offloading. Video traffic, in particular, is expected to be the dominant type of traffic in WLAN deployments. With the real-time requirements of some of these applications, WLAN users demand improved performance.

In a task group called IEEE 802.11ax, High Efficiency WLAN (HEW) standardization is under discussion. The HEW aims at improving performance felt by users demanding high-capacity and high-rate services. The HEW may include the capability to handle multiple simultaneous transmissions in both the spatial and frequency domains, in both the uplink (UL) and downlink (DL) directions.

During an uplink multi-user (MU) simultaneous transmission, multiple STAs may simultaneously transmit the same information in the same transmission waveform to an AP. In some situations, this may result in unintentional beamforming at the AP. The unintentional beamforming may hinder the AP's ability to detect and decode the transmissions even though the individual transmissions have high signal quality.

SUMMARY

The embodiments provide a method implemented by a first station (STA) in a Wireless Local Area Network (WLAN) for transmitting a frame to an Access Point (AP) as part of an uplink multi-user simultaneous transmission. The method avoids or reduces the occurrence of unintentional beamforming at the AP. The method includes receiving a first frame from the AP, where the first frame includes scheduling information for scheduling a simultaneous uplink transmission for the first STA and one or more other STAs. The method further includes generating a second frame having a common part and a user-specific part, where the second frame is to be transmitted simultaneously with frames generated by the one or more other STAs, according to the scheduling information. The method further includes determining a cyclic shift value to be applied to the common part of the second frame, where the cyclic shift value is determined to be different from one or more cyclic shift values to be applied by each of the one or more other STAs. The method further includes applying the cyclic shift value to the common part of the second frame and transmitting the second frame to the AP through a wireless medium.

The embodiments provide a network device for transmitting a frame to an Access Point (AP) as part of an uplink multi-user simultaneous transmission. The network device is to act as a first station (STA) in a Wireless Local Area Network (WLAN). The network device is configured to avoid or reduce the occurrence of unintentional beamforming at the AP. The network device includes a Radio Frequency (RF) transceiver, a non-transitory machine-readable medium having stored therein a multi-user simultaneous transmission module, and a set of one or more processors coupled to the non-transitory machine-readable medium. The set of one or more processors are configured to execute the multi-user simultaneous transmission module. The multi-user simultaneous transmission module is configured to receive, using the RF transceiver, a first frame from the AP, where the first frame includes scheduling information for scheduling a simultaneous uplink transmission for the first STA and one or more other STAs, generate a second frame having a common part and a user-specific part, where the second frame is to be transmitted simultaneously with frames generated by the one or more other STAs, according to the scheduling information, determine a cyclic shift value to be applied to the common part of the second frame, where the cyclic shift value is determined to be different from one or more cyclic shift values to be applied by each of the one or more other STAs, apply the cyclic shift value to the common part of the second frame, and transmit, using the RF transceiver, the second frame to the AP through a wireless medium.

BRIEF DESCRIPTION OF THE DRAWINGS

The present invention is illustrated by way of example, and not by way of limitation, in the figures of the accompanying drawings in which like references indicate similar elements. It should be noted that different references to "an" or "one" embodiment in this specification are not necessarily to the same embodiment, and such references mean at least one. Further, when a particular feature, structure, or characteristic is described in connection with an embodiment, it is submitted that it is within the knowledge of one skilled in the art to affect such feature, structure, or characteristic in connection with other embodiments whether or not explicitly described.

DETAILED DESCRIPTION

Figure 1:
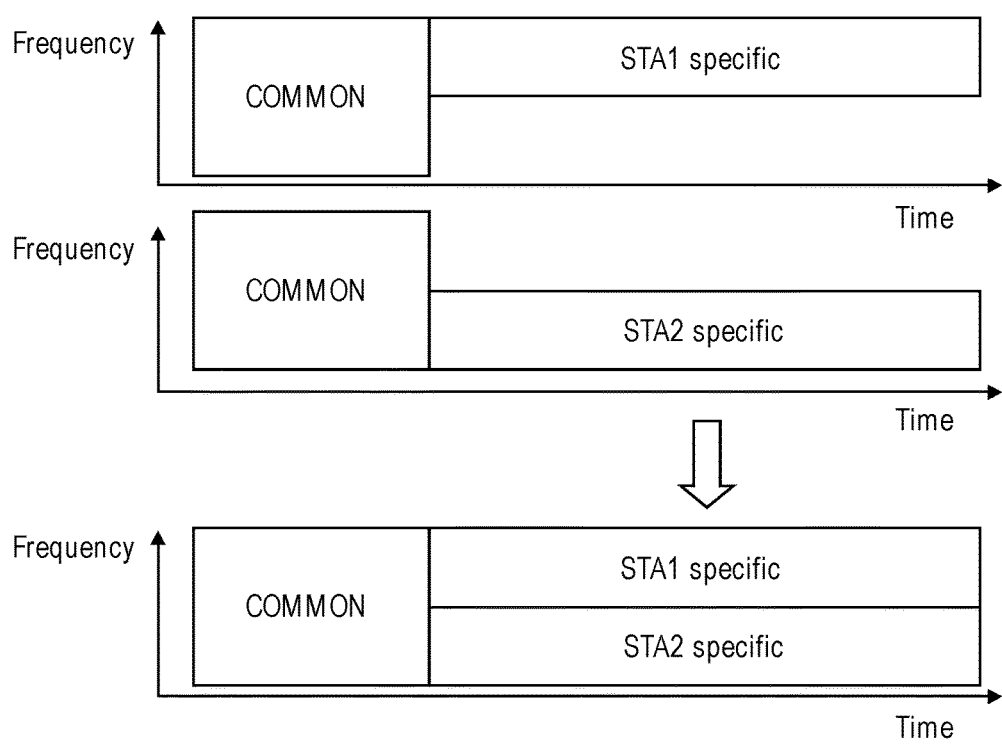
FIG. 1 is a diagram illustrating an uplink multi-user simultaneous transmission operation, according to some embodiments.

The embodiments disclosed herein provide a method and apparatus for avoiding (or reducing) the occurrence of unintentional beamforming during a multi-user simultaneous transmission. The method may be implemented by a first station (STA) in a Wireless Local Area Network (WLAN). The method includes receiving a first frame from an Access Point (AP), where the first frame includes scheduling information for scheduling a simultaneous uplink transmission for the first STA and one or more other STAs. In particular, the method includes generating a second frame having a common part and a user-specific part, where the second frame is to be transmitted simultaneously with frames generated by the one or more other STAs, according to the scheduling information. The method further includes determining a cyclic shift value to be applied to the common part of the second frame, where the cyclic shift value is determined to be different from one or more cyclic shift values to be applied by each of the one or more other STAs. In one embodiment, the cyclic shift value is determined based on the scheduling information included in the first frame. In another embodiment, the cyclic shift value that the first STA should apply is explicitly indicated in the first frame. In another embodiment, the cyclic shift value is determined based on randomness. The method further includes applying the cyclic shift value to the common part of the second frame and transmitting the second frame to the AP through a wireless medium. Each STA that participates in the uplink multi-user simultaneous transmission may perform similar operations. In this way, each STA that participates in the uplink multi-user simultaneous transmission applies a different cyclic shift value to its uplink frame and this avoids or reduces the occurrence of unintentional beamforming at the receiver-side (e.g., the AP). Other embodiments are also described and claimed.

In the following description, numerous specific details are set forth. However, it is understood that embodiments of the invention may be practiced without these specific details. In other instances, well-known circuits, structures and techniques have not been shown in detail in order not to obscure the understanding of this description. It will be appreciated, however, by one skilled in the art that the invention may be practiced without such specific details. Those of ordinary skill in the art, with the included descriptions, will be able to implement appropriate functionality without undue experimentation.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

In the following description and claims, the terms "coupled" and "connected," along with their derivatives, may be used. It should be understood that these terms are not intended as synonyms for each other. "Coupled" is used to indicate that two or more elements, which may or may not be in direct physical or electrical contact with each other, co-operate or interact with each other. "Connected" is used to indicate the establishment of communication between two or more elements that are coupled with each other. A "set," as used herein refers to any positive whole number of items including one item.

An electronic device stores and transmits (internally and/or with other electronic devices over a network) code (which is composed of software instructions and which is sometimes referred to as computer program code or a computer program) and/or data using machine-readable media (also called computer-readable media), such as non-transitory machine-readable media (e.g., machine-readable storage media such as magnetic disks, optical disks, read only memory, flash memory devices, phase change memory) and transitory machine-readable transmission media (also called a carrier) (e.g., electrical, optical, radio, acoustical or other form of propagated signals—such as carrier waves, infrared signals). Thus, an electronic device (e.g., a computer) includes hardware and software, such as a set of one or more processors coupled to one or more non-transitory machine-readable storage media (to store code for execution on the set of processors and data) and a set of one or more physical network interface(s) to establish network connections (to transmit code and/or data using propagating signals). Put another way, a typical electronic device includes memory comprising non-volatile memory (containing code regardless of whether the electronic device is on or off) and volatile memory (e.g., dynamic random access memory (DRAM), static random access memory (SRAM)), and while the electronic device is turned on that part of the code that is currently being executed is copied from the slower non-volatile memory into the volatile memory (often organized in a hierarchy) for execution by the processors of the electronic device.

A network device (ND) is an electronic device that communicatively interconnects other electronic devices on the network (e.g., other network devices, end-user devices). Some network devices are "multiple services network devices" that provide support for multiple networking functions (e.g., routing, bridging, switching, Layer 2 aggregation, session border control, Quality of Service, and/or subscriber management), and/or provide support for multiple application services (e.g., data, voice, and video). Network devices or network elements can include stations (STAs) and access points (APs) in wireless communications systems such as wireless local area network (WLAN). STAs are devices connected to and communicating in a WLAN including client or user devices that connect to the WLAN via access points (APs). APs are network devices that may be specialized wireless access points that can communicate with other network devices in the WLAN via the wireless medium or via wired connections. A STA or AP may be referred to herein as a WLAN device.

In a task group called IEEE 802.11ax, High Efficiency WLAN (HEW) standardization is under discussion. The HEW aims at improving performance felt by users demanding high-capacity and high-rate services. The HEW may support uplink (UL) multi-user (MU) simultaneous transmission, which includes uplink Multi-User Multiple-Input Multiple-Output (MU-MIMO) and uplink Orthogonal Frequency Division Multiple Access (OFDMA) transmissions. The most probable operation for uplink multi-user simultaneous transmission is as follows:

(1) An AP transmits a first frame that includes scheduling information for an uplink multi-user simultaneous transmission;
(2) All scheduled STAs that successfully receive the first frame send their frame in their designated resource in a predetermined time after reception of the first frame; and
(3) The AP transmits acknowledgment frames in response to receiving the uplink frames.

In the operations described above, even though multiple STAs transmit frames in their own designated resource, in order to support legacy STAs that do not understand the IEEE 802.11ax frame format, some parts of the transmitted frame are transmitted in a resource that is used by multiple STAs.

In one embodiment, the frame format for an uplink multi-user simultaneous transmission includes two parts: i) a common part and ii) a user-specific part. The common part is a portion of the frame that every scheduled STA transmits with exactly the same information. The signals transmitted by the scheduled STAs are combined in the air (i.e., Radio Frequency (RF) combining). The reasons for having exactly the same information in the common part is because multiple scheduled STAs transmit the common part in the same resource and the receiver of the common part cannot distinguish between frames coming from multiple scheduled STAs. The common part may include the legacy parts of the physical (PHY) layer preamble such as Legacy Short Training Field (L-STF), Legacy Long Training Field (L-LTF), Legacy Signal Field (L-SIG), a Repeated L-SIG Field (RL-SIG), and High Efficiency Signal A Field (HE-SIG-A).

The user-specific part is a portion of the frame where each scheduled STA sends its own information separately in a manner that the receiver of the frame can detect and decode (if received signal quality allows). In uplink OFDMA transmission, different STAs are allocated a different frequency resource, and thus there is no significant interference from other scheduled STAs if transmission time and frequency of all of the scheduled STAs are properly synchronized. In uplink MU-MIMO transmission, even though all scheduled STAs may transmit using the same frequency resource, due to multiple antenna processing and the STAs being scheduled in a spatially orthogonal (or almost orthogonal) manner, the target receiver of the frame can decode multiple frames transmitted by different STAs. The user-specific part may include each scheduled STA's payload (e.g., a MAC Protocol Data Unit (MPDU)).

FIG. 1 is a diagram illustrating an uplink multi-user simultaneous transmission operation, according to some embodiments. The diagram illustrates an uplink OFDMA transmission operation. The horizontal axis represents time and the vertical axis represents frequency. As shown, two STAs (STA1 and STA2) transmit their respective frames simultaneously. For this simultaneous transmission, the AP has allocated the upper part of the frequency band to STA1 and has allocated the lower part of the frequency band to STA2.

Even though STA1 and STA2 have been allocated different parts of the frequency band, both STAs transmit a common part before transmitting a user-specific part, and the common part transmitted by both STA1 and STA2 occupy the same frequency resource with the same information, and thus the common part transmitted by STA1 and STA2 is combined in the air. STA1 and STA2 transmit their respective user-specific part in their respective allocated frequency resource and the user-specific parts do not overlap (or interfere) with each other as long as transmission time and frequency of STA1 and STA2 are properly synchronized.

In some operation scenarios, an uplink multi-user simultaneous transmission may not work well even though the signal-to-noise ratio (SNR) of each of the individual signals transmitted by the scheduled STAs are high. For example, if channel delay spread is small and if the distance from multiple STAs scheduled for the uplink multi-user simultaneous transmission to the AP are similar, which is a typical situation for indoor operation, received signal quality at the AP, in particular for the common part, can be poor due to the occurrence of unintentional beamforming. For example, if an AP receives a common part transmitted by two different STAs and these two signals have exactly the same power and are 180 degrees out of phase, the combined signal at the AP for the common part is diminished, and thus the AP may not be able to detect and decode the common part of the frame. As a result, the AP may also not be able to initiate decoding of the user-specific part of the transmission for both STAs. As such, in a worst case scenario, the AP may not be able to decode the user-specific parts scheduled in the orthogonal resource even though the received signal quality for each user-specific part is good.

For example, if two STAs transmit the same signal and both STAs are located at a distance that is 10 meters away from the AP (for simplicity, line-of-sight for the channel is assumed), the received signal can be modeled as a two-path channel with (almost) equal received power, where the first path arrives at the AP at time t=0 and the second path arrives at the AP with delay at time t=T1.

Assuming that the delay is 33 nanoseconds (that is, T1=33 nanoseconds), the coherence bandwidth can be approximated as $$\frac{1}{33*10^{-9}},$$

which corresponds to around 30 MHz. This implies that if two path signals happen to be out-of-phase in one frequency band, it will be in deep fading (out-of-phase) in average for around 30 MHz bandwidth. Considering that the basic channel bandwidth for IEEE 802.11 frame transmission is 20 MHz, a coherence bandwidth of 30 MHz means that the signal will remain in deep fading for the entire 20 MHz transmission channel bandwidth. It is likely that an attempt to detect and decode such a signal will result in failure.

In a frequency selective channel environment, the impact of unintentional beamforming is less significant due to the coherence bandwidth of the channel becoming narrower. In a frequency selective channel, even if the received common part signal from two STAs are out-of-phase in some part of the frequency band, statistically the received common part signal from two STAs in different parts of the frequency band will not be in an out-of-phase state, and thus the overall received signal will avoid a total deep fading effect.

In some systems, if a STA has multiple transmit antennas (and thus multiple transmit chains) and the STA transmits the same signal through each of the multiple transmit chains, a mechanism called Cyclic Shift Diversity (CSD) may be applied to prevent the effects of unintentional beamforming at the receiver-side. In CSD, when a STA transmits an Orthogonal Frequency Division Multiplexing (OFDM) symbol through multiple transmit chains, the STA applies different cyclic shift values for each transmit chain, such that at least during the OFDM symbol duration, the received signal from different transmit chains experience different path delay, and this provides an intentional frequency selective channel condition.

Table I lists cyclic shift values for each transmit chain for the legacy part of the Physical Layer Convergence Protocol (PLCP) Protocol Data Unit (PPDU). As shown in Table I, the cyclic shift values assigned to each transmit chain may be different depending on the total number of transmit chains. For example, according to Table I, if the STA has 2 transmit chains, then the first transmit chain is assigned a cyclic shift value of 0 and the second transmit chain is assigned a cyclic shift value of −200. As another example, according to Table I, if the STA has 3 transmit chains, then the first transmit chain is assigned a cyclic shift value of 0, the second transmit chain is assigned a cyclic shift value of −100, and the third transmit chain is assigned a cyclic shift value of −200. In this embodiment, the first transmit chain always has 0 delay (cyclic shift value of 0) regardless of the number of transmit chains. The other transmit chains typically have non-zero cyclic shift values.

TABLE I $T_{CS}^{iTX}$ values for L-STF, L-LTF, L-SIG, and VHT-SIG-A fields of the PPDU

| Total number of transmit chains ($N_{TX}$ per frequency segment) | Cyclic shift for transmit chain $i_{TX}$ (in units of ns) | | | | | | | | |
|---|---|---|---|---|---|---|---|---|---|
| | 1 | 2 | 3 | 4 | 5 | 6 | 7 | 8 | >8 |
| 1 | 0 | — | — | — | — | — | — | — | — |
| 2 | 0 | −200 | — | — | — | — | — | — | — |
| 3 | 0 | −100 | −200 | — | — | — | — | — | — |
| 4 | 0 | −50 | −100 | −150 | — | — | — | — | — |
| 5 | 0 | −175 | −25 | −50 | −75 | — | — | — | — |
| 6 | 0 | −200 | −25 | −150 | −175 | −125 | — | — | — |
| 7 | 0 | −200 | −150 | −25 | −175 | −75 | −50 | — | — |
| 8 | 0 | −175 | −150 | −125 | −25 | −100 | −50 | −200 | — |
| >8 | 0 | −175 | −150 | −125 | −25 | −100 | −50 | −200 | Between −200 and 0 inclusive |

However, this CSD mechanism does not address the unintentional beamforming problems that occur in a multi-user simultaneous transmission. For example, if there are multiple STAs scheduled for simultaneous transmission and if each STA has one transmit antenna (and thus one transmit chain), all of the scheduled STAs will apply a CSD value of 0, which in turn implies that no CSD is applied. As such, this CSD mechanism does not solve the unintentional beamforming problem when multiple STAs simultaneously transmit the same signal/information.

In one embodiment, in order to avoid the occurrence of unintentional beamforming when multiple STAs simultaneously transmit the same signal/information, different STAs that are scheduled for an uplink multi-user simultaneous transmission apply different cyclic shift values, even for that STA's first transmit chain. The different cyclic shift values to be applied by the different STAs can be determined in various different ways. For example, the cyclic shift values can be assigned to each of the STAs (e.g., by an AP) or independently determined by each STA. Several embodiments are described herein below.

Figure 2A:
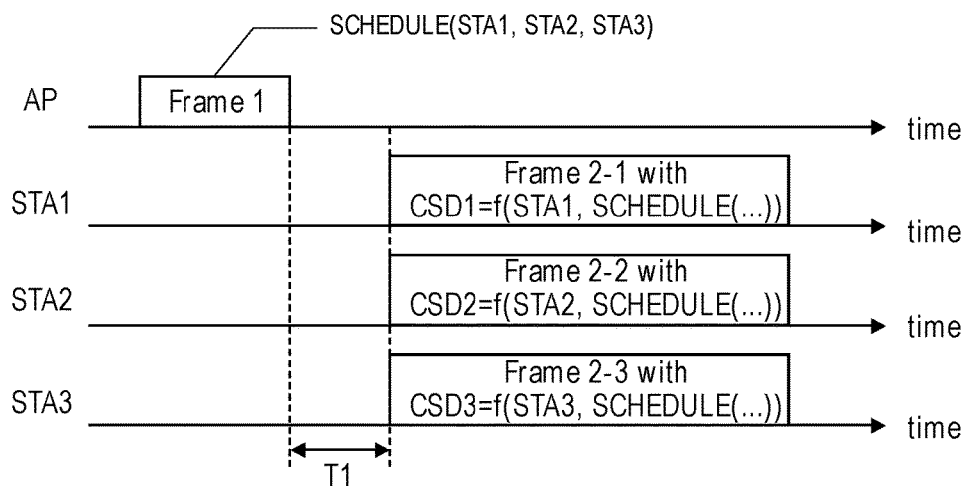
FIG. 2A is a timing diagram illustrating an uplink multi-user simultaneous transmission operation where each STA applies a cyclic shift value that is determined based on scheduling information transmitted by an AP, according to some embodiments.

FIG. 2A is a timing diagram illustrating an uplink multi-user simultaneous transmission operation where each STA applies a cyclic shift value that is determined based on scheduling information transmitted by an AP, according to some embodiments. In this exemplary embodiment, a mapping function that provides a mapping between a cyclic shift value and scheduling information for the i-th STA (f(STAi, SCHEDULE( . . . ))) may be pre-defined and every STA that participates in an uplink multi-user simultaneous transmission has knowledge of this mapping function before the uplink multi-user simultaneous transmission occurs. As will be described in additional detail below, each STA that is scheduled for an uplink multi-user simultaneous transmission may determine a cyclic shift value to apply to its uplink frame using the mapping function.

As shown, the AP transmits a first frame that includes scheduling information for an uplink multi-user simultaneous transmission. In this example, STA1, STA2, and STA3 are scheduled for simultaneous transmission and this is indicated in the first frame as SCHEDULE(STA1, STA2, STA3). All scheduled STAs that successfully receive the first frame (e.g., at least the part of the first frame that includes scheduling information pertaining to itself) transmit their uplink frame in their respective designated resource at a predetermined time (T1) after reception of the first frame, where each STA applies a cyclic shift value on a first part of the uplink frame (e.g., the common part) that is determined in accordance with the mapping function and the scheduling information indicated in Frame 1. According to the mapping function, the first scheduled STA (STA1) should apply cyclic shift value of CSD1, the second scheduled STA (STA2) should apply cyclic shift value of CSD2, and the third schedules STA (STA3) should apply cyclic shift value of CSD3. In this way, each scheduled STA applies a different cyclic shift value even without receiving an explicit indication of which cyclic shift value to apply. This can help avoid (or reduce) the occurrence of unintentional beamforming at the receiver-side (e.g., the AP). An example of this embodiment is described with reference to FIG. 2B.

Figure 2B:
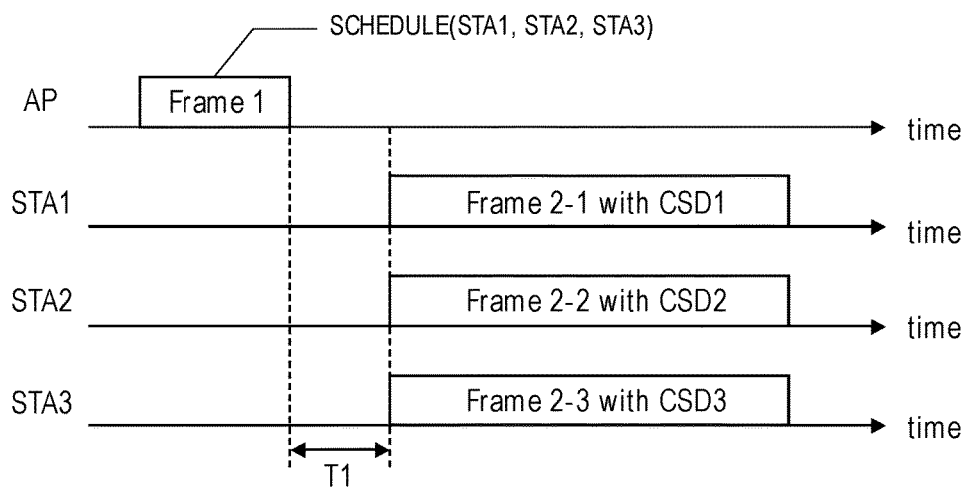
FIG. 2B is a timing diagram illustrating an uplink multi-user simultaneous transmission operation where each STA applies a cyclic shift value that is determined based on a scheduling order of that STA, according to some embodiments.

FIG. 2B is a timing diagram illustrating an uplink multi-user simultaneous transmission operation where each STA applies a cyclic shift value that is determined based on a scheduling order of that STA, according to some embodiments. In this exemplary embodiment, each STA that is scheduled for an uplink multi-user simultaneous transmission determines a cyclic shift value to apply to its uplink frame based on that STA's order in the scheduling information.

As shown, the AP transmits a first frame that includes scheduling information for an uplink multi-user simultaneous transmission. In this example, STA1, STA2, and STA3 are scheduled (in that order) for simultaneous transmission and this is indicated in the first frame as SCHEDULE(STA1, STA2, STA3). All scheduled STAs that successfully receive the first frame (e.g., at least the part of the first frame that includes scheduling information pertaining to itself) transmit their uplink frame in their respective designated resource at a predetermined time (T1) after reception of the first frame, where each STA applies a cyclic shift value on a first part of the uplink frame (e.g., the common part) that is determined based on that STA's order in the scheduling information indicated in the first frame. In this example, this implies that the first scheduled STA (STA1) should apply cyclic shift value of CSD1, the second scheduled STA (STA2) should apply cyclic shift value of CSD2, and the third scheduled STA (STA3) should apply cyclic shift value of CSD3. In this way, each scheduled STA applies a different cyclic shift value even without receiving an explicit indication of which cyclic shift value to apply. This can help avoid (or reduce) the occurrence of unintentional beamforming at the receiver-side (e.g., the AP).

Figure 3:
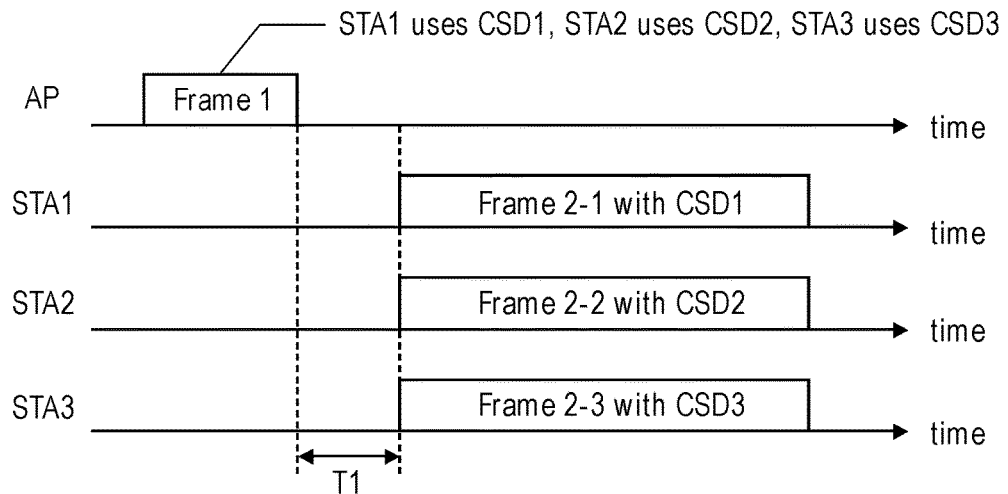
FIG. 3 is a timing diagram illustrating an uplink multi-user simultaneous transmission operation where an AP explicitly indicates the cyclic shift values that each STA should apply, according to some embodiments.

FIG. 3 is a timing diagram illustrating an uplink multi-user simultaneous transmission operation where an AP explicitly indicates the cyclic shift values that each STA should apply, according to some embodiments. In this exemplary embodiment, the AP explicitly assigns a cyclic shift value for each STA that is scheduled for an uplink multi-user simultaneous transmission. Each scheduled STA then applies its assigned cyclic shift value to its uplink frame.

As shown, the AP transmits a first frame that includes scheduling information for an uplink multi-user simultaneous transmission. In this example, STA1, STA2, and STA3 are scheduled for simultaneous transmission and this is indicated in the first frame. The first frame also includes an indication of cyclic shift values that each STA should apply. In this example, the first frame indicates that STA1 should apply cyclic shift value of CSD1, STA2 should apply cyclic shift value of CSD2, and STA3 should apply cyclic shift value of CSD3. All scheduled STAs that successfully receive the first frame (e.g., at least the part of the first frame that includes scheduling information pertaining to itself) transmit their uplink frame in their respective designated resource at a predetermined time (T1) after reception of the first frame, where each STA applies a cyclic shift value on a first part of the uplink frame (e.g., the common part), as indicated in the first frame. Thus, STA1 should apply cyclic shift value of CSD1, STA2 should apply cyclic shift value of CSD2, and STA3 should apply cyclic shift value of CSD3. In this way, each scheduled STA applies a different cyclic shift value and this can help avoid (or reduce) the occurrence of unintentional beamforming at the receiver-side (e.g., the AP).

Figure 4:
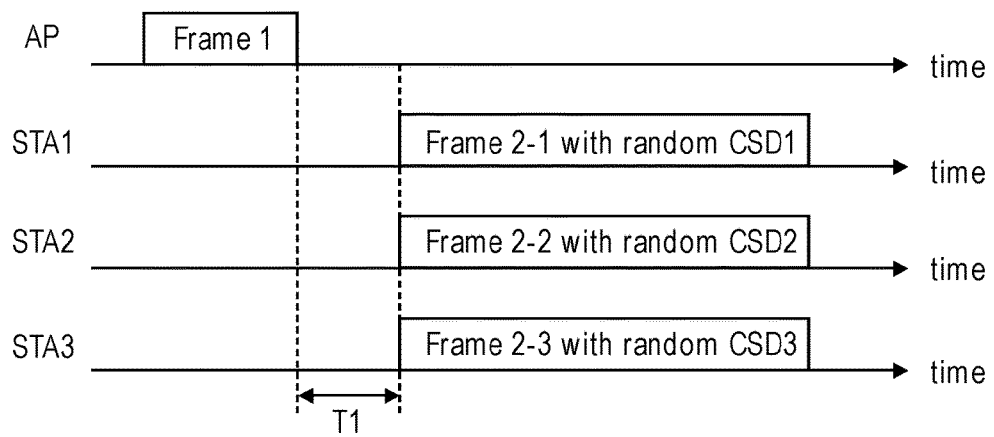
FIG. 4 is a timing diagram illustrating an uplink multi-user simultaneous transmission operation where each STA applies a cyclic shift value that is determined based on randomness, according to some embodiments.

FIG. 4 is a timing diagram illustrating an uplink multi-user simultaneous transmission operation where each STA applies a cyclic shift value that is determined based on randomness, according to some embodiments. In this exemplary embodiment, each STA that is scheduled for an uplink multi-user simultaneous transmission determines a cyclic shift value to apply to its uplink frame based on randomness.

As shown, the AP transmits a first frame that initiates an uplink multi-user simultaneous transmission. In this example, STA1, STA2, and STA3 are scheduled for simultaneous transmission. All scheduled STAs that successfully receive the first frame (e.g., at least the part of the first frame that includes scheduling information pertaining to itself) transmit their uplink frame in their respective designated resource at a predetermined time (T1) after reception of the first frame, where each STA applies a randomly determined cyclic shift value on a first part of the uplink frame (e.g., the common part). In this example, STA1 applies randomly determined cyclic shift value of CSD1, STA2 applies randomly determined cyclic shift value of CSD2, and STA3 applies randomly determined cyclic shift value of CSD3. In one embodiment, a STA randomly picks a cyclic shift value among multiple candidate values. In another embodiment, a STA randomly picks a cyclic shift value from a predetermined range of values. In yet another embodiment, a STA randomly picks a cyclic shift value with predetermined granularity. In this way, each scheduled STA applies a different cyclic shift value even without receiving an explicit indication of which cyclic shift value to apply. This can help avoid (or reduce) the occurrence of unintentional beamforming at the receiver-side (e.g., the AP).

In one embodiment, if a STA has more than one transmit chain (e.g., multiple antennas), the cyclic shift values to apply to each transmit chain are chosen randomly. In another embodiment, if a STA has more than one transmit chain, the cyclic shift value to apply to the first transmit chain may be chosen randomly and the cyclic shift values to apply to the other transmit chains may follow a pre-determined rule.

In one embodiment, if a STA has more than one transmit chain, the cyclic shift value to apply to the first transmit chain is a non-zero cyclic shift value (e.g., determined using techniques described above with reference to FIGS. 2A, 2B, 3, and 4), and the cyclic shift values to apply to the other transmit chains are determined by following a pre-defined rule. For example, the cyclic shift values to apply to the other transmit chains may be determined as a predefined offset from the cyclic shift value to be applied by the first transmit chain. Table II lists cyclic shift values for each transmit chain. As shown in Table II, the cyclic shift values assigned to each transmit chain may be different depending on the total number of transmit chains.

TABLE II

| Total number of transmit chains | Cyclic shift for transmit chain (in units of us) | | | | | | | | |
|---|---|---|---|---|---|---|---|---|---|
| | 1 | 2 | 3 | 4 | 5 | 6 | 7 | 8 | >8 |
| 1 | D | — | — | — | — | — | — | — | — |
| 2 | D | D-200 | — | — | — | — | — | — | — |
| 3 | D | D-100 | D-200 | — | — | — | — | — | — |
| 4 | D | D-50 | D-100 | D-150 | — | — | — | — | — |
| 5 | D | D-175 | D-25 | D-50 | D-75 | — | — | — | — |
| 6 | D | D-200 | D-25 | D-150 | D-175 | D-125 | — | — | — |
| 7 | D | D-200 | D-150 | D-25 | D-175 | D-75 | D-50 | — | — |
| 8 | D | D-175 | D-150 | D-125 | D-25 | D-100 | D-50 | D-200 | — |
| >8 | D | D-175 | D-150 | D-125 | D-25 | D-100 | D-50 | D-200 | Between D-200 and D inclusive |

In Table II, the first transmit chain is always assigned a cyclic shift value of D, regardless of the number of transmit chains. The value of D will be different for different STAs that are scheduled for an uplink multi-user simultaneous transmission. The value of D can be determined using any of the techniques described above with reference to FIGS. 2A, 2B, 3, and 4 (or variations thereof). The cyclic shift values for the other transmit chains are defined to be a predetermined offset from D (e.g., D+x, where x is an offset). For example, according to Table II, if a STA has 2 transmit chains, then the first transmit chain is assigned a cyclic shift value of D and the second transmit chain is assigned a cyclic shift value of D-200 (i.e., the offset is −200). As another example, according to Table II, if the STA has 3 transmit chains, then the first transmit chain is assigned a cyclic shift value of D, the second transmit chain is assigned a cyclic shift value of D-100, and the third transmit chain is assigned a cyclic shift value of D-200.

In one embodiment, if an assigned cyclic shift value, D+x, is greater than a threshold value (T), then a cyclic shift value of mod(D+x, T) is used instead of D+x, where mod(a, b) denotes the remainder of the division of a by b. In one embodiment, the same D value is used for the entire transmission channel bandwidth. In another embodiment, different D value is used for different channel bandwidth. In one embodiment, non-zero D value is used only when more than one STA is scheduled in a multi-user simultaneous transmission. In one embodiment, D is set to zero for a single user transmission, while non-zero D value is used when more than one STA is scheduled for multi-user simultaneous transmission.

Figure 5A:
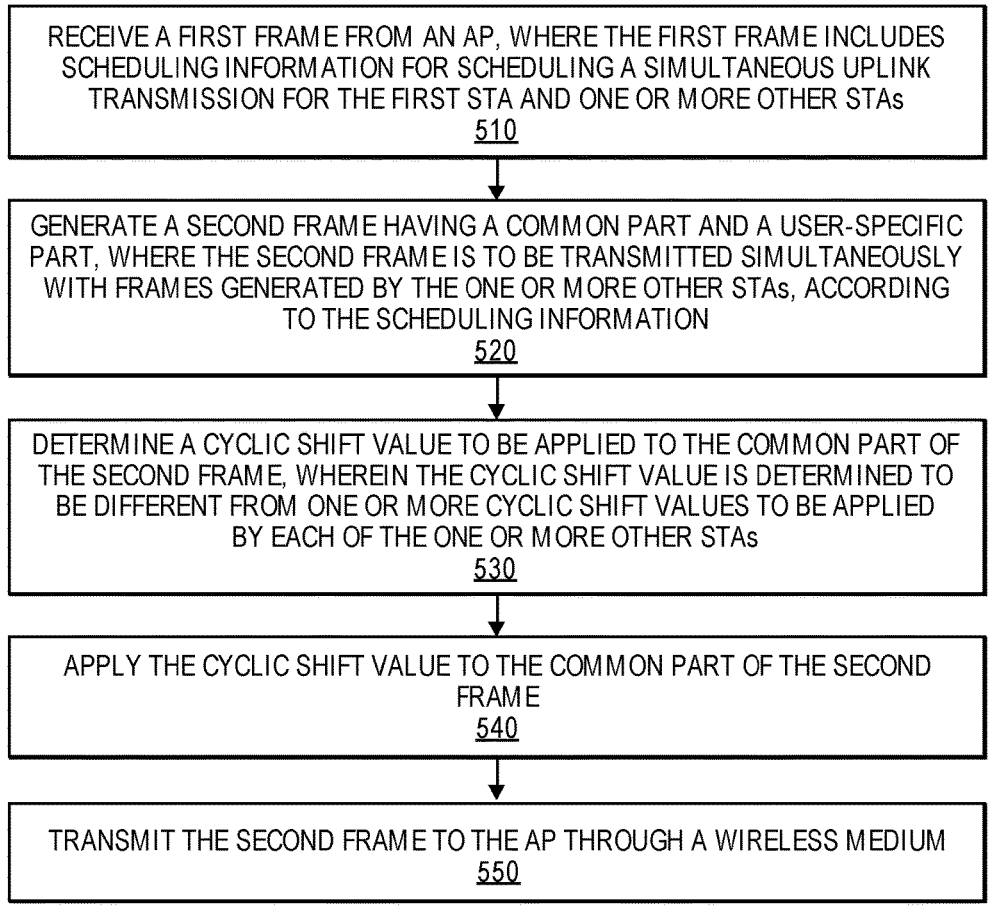
FIG. 5A is a flow diagram of a process for transmitting a frame in a wireless communications network as part of an uplink multi-user simultaneous transmission, according to some embodiments.

FIG. 5A is a flow diagram of a process for transmitting a frame in a wireless communications network as part of an uplink multi-user simultaneous transmission, according to some embodiments. The process avoids (or reduces) the occurrence of unintentional beamforming at the receiver-side. In one embodiment, the operations of the flow diagram may be performed by a network device (e.g., a WLAN device such as a STA) in a wireless communications network (e.g., a WLAN). The operations in this flow diagram and other flow diagrams will be described with reference to the exemplary embodiments of the other figures. However, it should be understood that the operations of the flow diagrams can be performed by embodiments of the invention other than those discussed with reference to the other figures, and the embodiments of the invention discussed with reference to these other figures can perform operations different than those discussed with reference to the flow diagrams.

In one embodiment, the process is initiated when a first STA receives a first frame from an AP, where the first frame includes scheduling information for scheduling a simultaneous uplink transmission for the first STA and one or more other STAs (block 510). In one embodiment, the scheduling information may assign different STAs to different frequency resources or spatial streams. In one embodiment, the scheduling order of STAs in the scheduling information indicates which frequency resource is assigned to which STA. For example, the first scheduled STA in the scheduling information is assigned to a first frequency resource, the second scheduled STA in the scheduling information is assigned to a second frequency resource, and so on. In one embodiment, the first frame includes an explicit indication of a cyclic shift value assigned to the first STA (and the other STAs as well).

The first STA generates a second frame having a common part and a user-specific part (block 520). The second frame is to be transmitted simultaneously with frames generated by the one or more other STAs, according to the scheduling information.

The first STA determines a cyclic shift value to be applied to the common part of the second frame, where the cyclic shift value is determined to be different from one or more cyclic shift values to be applied by each of the one or more other STAs (block 530). In one embodiment, the cyclic shift value is determined based on the scheduling information included in the first frame. For example, in one embodiment, the cyclic shift value is determined based on a scheduling order of the first STA in the scheduling information, where the scheduling order of the first STA indicates which frequency resource or spatial stream the first STA should use for transmission. In one embodiment, the cyclic shift value is determined based on an explicit indication of the cyclic shift value in the first frame (i.e., the first STA uses the cyclic shift value that has been assigned to it in the first frame). In one embodiment, the cyclic shift value is determined based on randomness. For example, in one embodiment, the cyclic shift value is randomly selected from a predetermined range of values. In another embodiment, the cyclic shift value is randomly selected from a set of predetermined values.

The first STA then applies the cyclic shift value to the common part of the second frame (block 540) and transmits the second frame to the AP through a wireless medium (block 550). In this way the first STA determines and applies a cyclic shift value that is different from the cyclic shift values applied by the other STAs. This helps avoid (or reduce) the occurrence of unintentional beamforming at the receiver-side (e.g., the AP).

In one embodiment, if the first STA has multiple transmit chains, then each transmit chain is assigned a different cyclic shift value. In one embodiment, the first transmit chain is assigned a cyclic shift value using the techniques described above (e.g., as described with reference to FIGS. 2A, 2B, 3, 4, and 5A) and the other transmit chains are assigned cyclic shift values that are different from the cyclic shift value assigned to the first transmit chain. For example, the cyclic shift values assigned to the other transmit chains may be pre-determined offsets from the cyclic shift value assigned to the first transmit chain (e.g., as shown in Table II). Each transmit chain may apply its assigned cyclic shift value when transmitting a frame in order to avoid (or reduce) the occurrence of unintentional beamforming at the receiver-side.

Figure 5B:
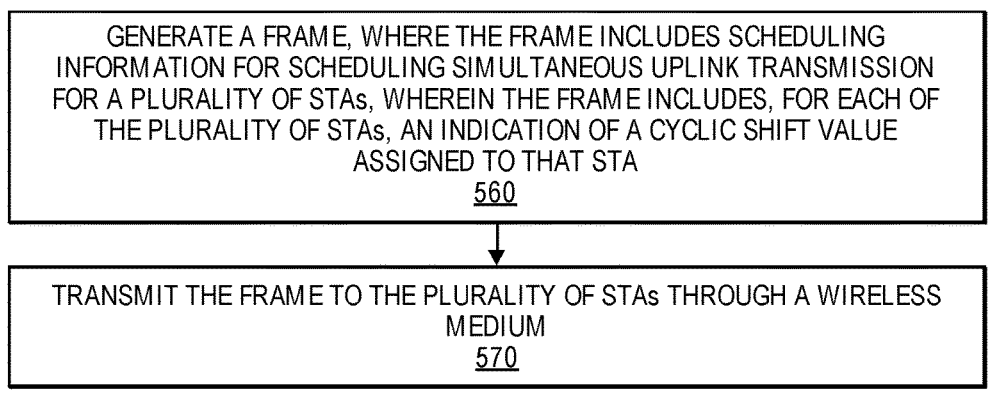
FIG. 5B is a flow diagram of a process for transmitting scheduling information to schedule an uplink multi-user simultaneous transmission in a wireless communications network, according to some embodiments.

FIG. 5B is a flow diagram of a process for transmitting scheduling information for scheduling an uplink multi-user simultaneous transmission in a wireless communications network, according to some embodiments. The process is for an embodiment where the cyclic shift values that STAs scheduled for an uplink multi-user simultaneous transmission should apply are explicitly indicated in the frame that schedules the uplink multi-user simultaneous transmission. In one embodiment, the operations of the flow diagram may be performed by a network device (e.g., a WLAN device such as an AP) in a wireless communications network (e.g., a WLAN).

In one embodiment, the process is initiated when an AP wishes to schedule an uplink multi-user simultaneous transmission. The AP generates a frame, where the frame includes scheduling information for scheduling a simultaneous uplink transmission for a plurality of STAs, where the frame includes, for each of the plurality of STAs, an indication of a cyclic shift value assigned to that STA (block 560). In one embodiment, each of the plurality of STAs is assigned a different cyclic shift value. The AP then transmits the frame to the plurality of STAs through a wireless medium (block 570). The plurality of STAs may apply their respective assigned cyclic shift value during the uplink multi-user simultaneous transmission (e.g., to a common part of an uplink frame) in order to avoid (or reduce) the occurrence of unintentional beamforming at the receiver-side.

Figure 6:
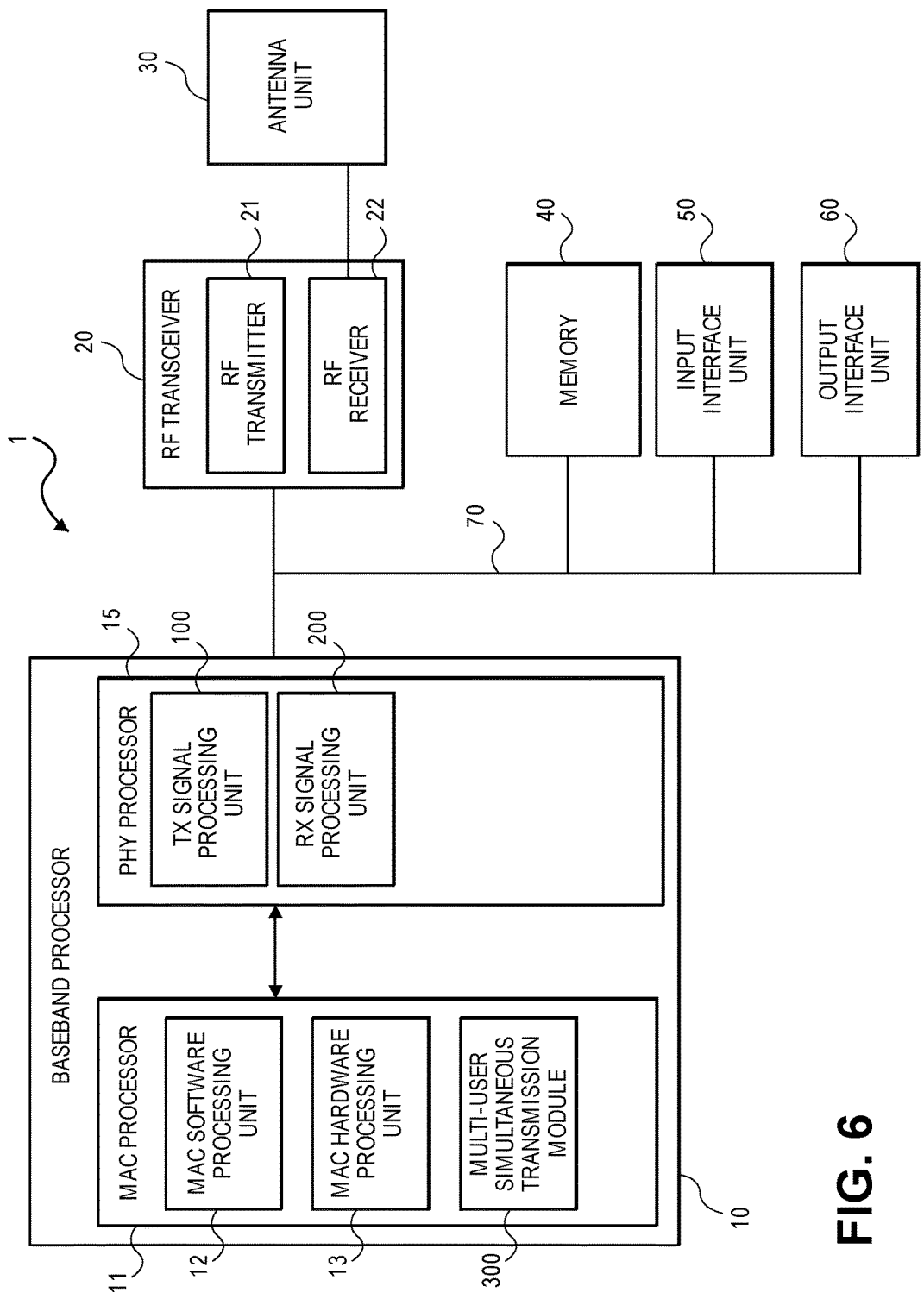
FIG. 6 is a block diagram of a network device implementing a station or access point that executes a link adaptation process and module, according to some embodiments.
Figure 7:
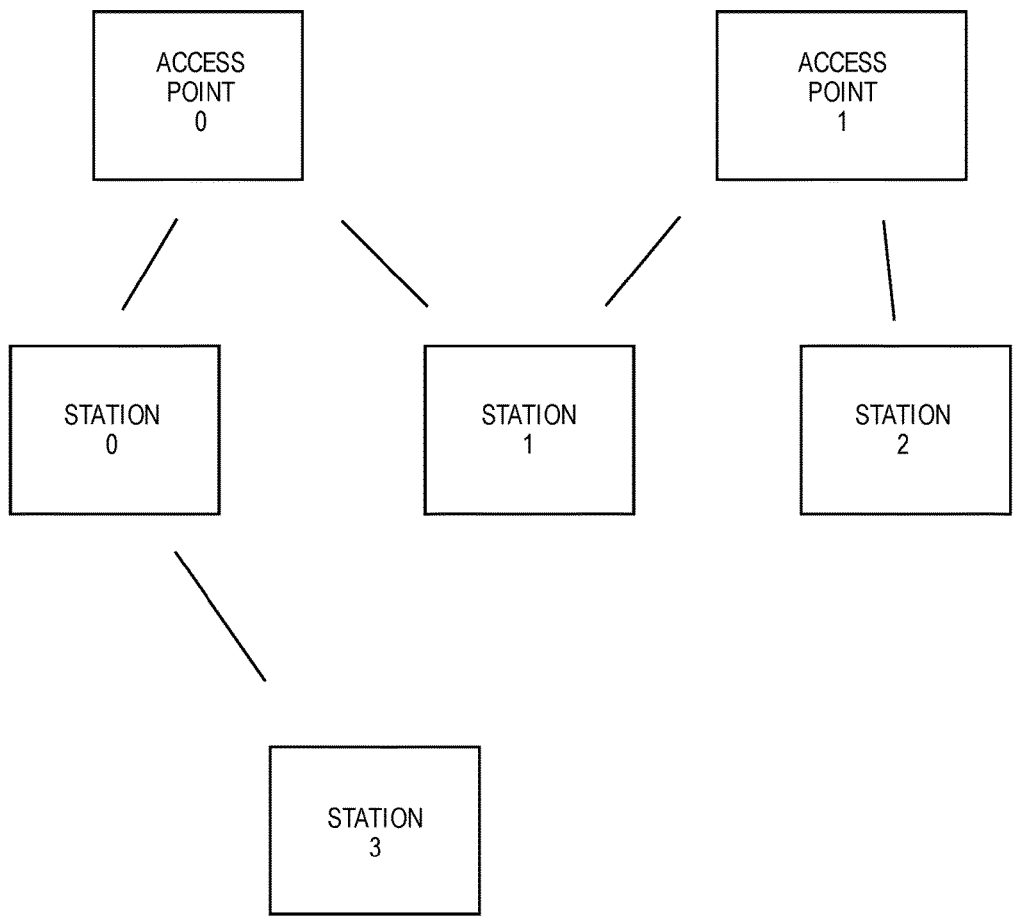
FIG. 7 is a block diagram of a WLAN, according to some embodiments.

FIG. 6 is a block diagram of a network device implementing a station or access point that executes a link adaptation process and module, according to some embodiments. In a wireless local area network (WLAN) such as the example WLAN illustrated in FIG. 7, a basic service set (BSS) includes a plurality of network devices referred to herein as WLAN devices. Each of the WLAN devices may include a medium access control (MAC) layer and a physical (PHY) layer according to IEEE 802.11 standard. In the plurality of WLAN devices, at least one WLAN device may be an access point (AP) station (e.g., access point 0 and access point 1 in FIG. 7) and the other WLAN devices may be non-AP stations (non-AP STAs), (e.g., stations 0-3 in FIG. 7). Alternatively, all of the plurality of WLAN devices may be non-AP STAs in an Ad-hoc networking environment. In general, the AP STA and the non-AP STA may be each referred to herein as a station (STA). However, for ease of description, only the non-AP STA will be referred to herein as a STA whereas the AP stations are referred to herein as APs for ease of description. As shown in FIG. 7, a WLAN can have any combination of stations and access points that can form a discrete network, an ad hoc network or any combination thereof. Any number of APs and stations can be included in a WLAN and any topology and configuration of such APs and stations in the network can be utilized.

The example WLAN device 1 includes a baseband processor 10, a radio frequency (RF) transceiver 20, an antenna unit 30, memory 40, an input interface unit 50, an output interface unit 60, and a bus 70. The baseband processor 10 performs baseband signal processing, and includes a MAC processor 11 and a PHY processor 15. These processors can be any type of integrated circuit (IC) including a general processing unit or an application specific integrated circuit (ASIC). In some embodiments, the MAC processor 11 also implements a multi-user simultaneous transmission module 300. The multi-user simultaneous transmission module 300 can implement the respective functions for any combination of the embodiments described herein above with regard to FIGS. 1-5. In other embodiments, the multi-user simultaneous transmission module 300 may be implemented by or distributed over both the PHY processor 15 and the MAC processor 11. The multi-user simultaneous transmission module 300 may be implemented as software or as hardware components of either the PHY processor 15 or MAC processor 11.

In one embodiment, the MAC processor 11 may include a MAC software processing unit 12 and a MAC hardware processing unit 13. The memory 40 may store software (hereinafter referred to as "MAC software"), including at least some functions of the MAC layer. The MAC software processing unit 12 executes the MAC software to implement some functions of the MAC layer and the MAC hardware processing unit 13 may implement the remaining functions of the MAC layer in hardware (hereinafter referred to "MAC hardware"). However, the MAC processor 11 is not limited to this distribution of functionality.

The PHY processor 15 includes a transmitting signal processing unit 100 and a receiving signal processing unit 200 described further herein below with reference to FIGS. 9 and 10.

The baseband processor 10, the memory 40, the input interface unit 50, and the output interface unit 60 may communicate with each other via the bus 70. The radio frequency (RF) transceiver 20 includes an RF transmitter 21 and an RF receiver 22. The memory 40 may further store an operating system and applications. In some embodiments, the memory may store recorded information about captured frames. The input interface unit 50 receives information from a user and the output interface unit 60 outputs information to the user.

The antenna unit 30 includes one or more antennas. When a MIMO or MU-MIMO system is used, the antenna unit 30 may include a plurality of antennas.

Figure 8:
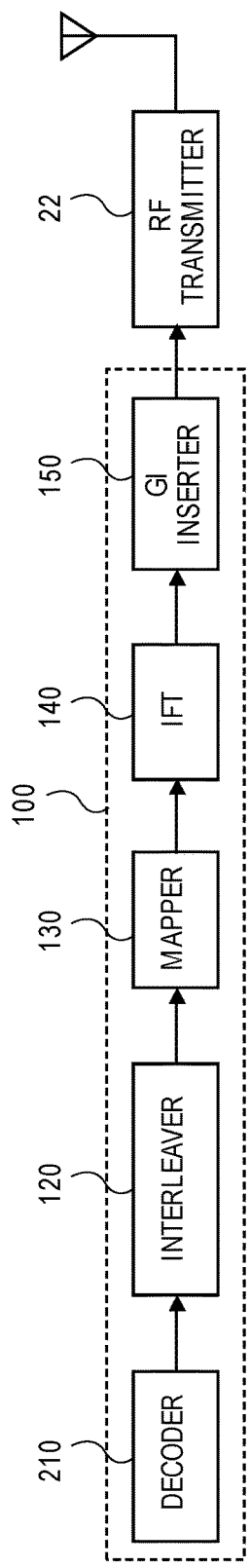
FIG. 8 is a schematic block diagram exemplifying a transmitting signal processor in a WLAN device, according to some embodiments.

FIG. 8 is a schematic block diagram exemplifying a transmitting signal processor in a WLAN device, according to some embodiments. Referring to the above drawing, a transmitting signal processing unit 100 includes an encoder 110, an interleaver 120, a mapper 130, an inverse Fourier transformer (IFT) 140, and a guard interval (GI) inserter 150. The encoder 110 encodes input data. For example, the encoder 110 may be a forward error correction (FEC) encoder. The FEC encoder may include a binary convolutional code (BCC) encoder followed by a puncturing device or may include a low-density parity-check (LDPC) encoder.

The transmitting signal processing unit 100 may further include a scrambler for scrambling the input data before encoding to reduce the probability of long sequences of 0s or 1s. If BCC encoding is used in the encoder 110, the transmitting signal processing unit 100 may further include an encoder parser for demultiplexing the scrambled bits among a plurality of BCC encoders. If LDPC encoding is used in the encoder 110, the transmitting signal processing unit 100 may not use the encoder parser.

The interleaver 120 interleaves the bits of each stream output from the encoder to change the order of bits. Interleaving may be applied only when BCC encoding is used. The mapper 130 maps the sequence of bits output from the interleaver to constellation points. If LDPC encoding is used in the encoder 110, the mapper 130 may further perform LDPC tone mapping in addition to constellation mapping.

When multiple input-multiple output (MIMO) or multiple user (MU)-MIMO is used, the transmitting signal processing unit 100 may use a plurality of interleavers 120 and a plurality of mappers 130 corresponding to the number Nss of spatial streams. In this case, the transmitting signal processing unit 100 may further include a stream parser for dividing outputs of the BCC encoders or the LDPC encoder into blocks that are sent to different interleavers 120 or mappers 130. The transmitting signal processing unit 100 may further include a space-time block code (STBC) encoder for spreading the constellation points from the $N_{SS}$ spatial streams into $N_{STS}$ space-time streams and a spatial mapper for mapping the space-time streams to transmit chains. The spatial mapper may use direct mapping, spatial expansion, or beamforming.

The IFT 140 converts a block of the constellation points output from the mapper 130 or the spatial mapper to a time domain block (i.e., a symbol) by using an inverse discrete Fourier transform (IDFT) or an inverse fast Fourier transform (IFFT). If the STBC encoder and the spatial mapper are used, the inverse Fourier transformer 140 may be provided for each transmit chain.

When MIMO or MU-MIMO is used, the transmitting signal processing unit 100 may insert cyclic shift diversities (CSDs) to prevent unintentional beamforming. The CSD insertion may occur before or after the inverse Fourier transform 140. The CSD may be specified per transmit chain or may be specified per space-time stream. Alternatively, the CSD may be applied as a part of the spatial mapper. When MU-MIMO is used, some blocks before the spatial mapper may be provided for each user.

The GI inserter 150 prepends a GI to the symbol. The transmitting signal processing unit 100 may optionally perform windowing to smooth edges of each symbol after inserting the GI. The RF transmitter 21 converts the symbols into an RF signal and transmits the RF signal via the antenna unit 30. When MIMO or MU-MIMO is used, the GI inserter 150 and the RF transmitter 21 may be provided for each transmit chain.

Figure 9:
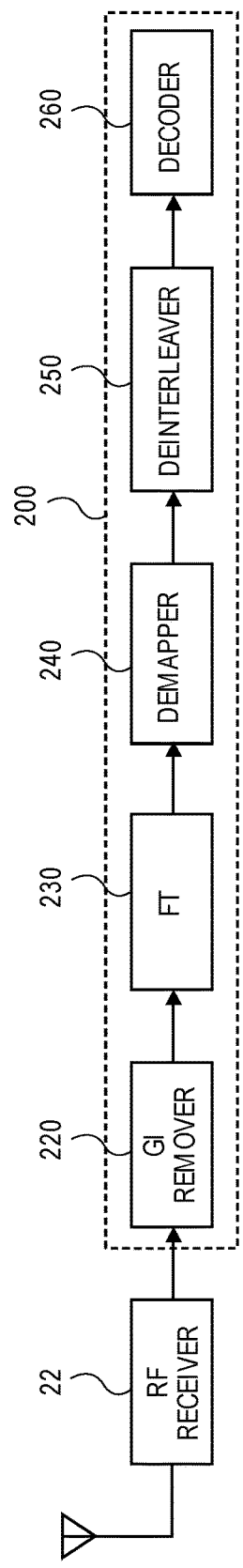
FIG. 9 is a schematic block diagram exemplifying a receiving signal processing unit in the WLAN, according to some embodiments.

FIG. 9 is a schematic block diagram exemplifying a receiving signal processing unit in the WLAN, according to some embodiments. Referring to FIG. 9, a receiving signal processing unit 200 includes a GI remover 220, a Fourier transformer (FT) 230, a demapper 240, a deinterleaver 250, and a decoder 260.

An RF receiver 22 receives an RF signal via the antenna unit 30 and converts the RF signal into symbols. The GI remover 220 removes the GI from the symbol. When MIMO or MU-MIMO is used, the RF receiver 22 and the GI remover 220 may be provided for each receive chain.

The FT 230 converts the symbol (i.e., the time domain block) into a block of constellation points by using a discrete Fourier transform (DFT) or a fast Fourier transform (FFT). The Fourier transformer 230 may be provided for each receive chain.

When MIMO or MU-MIMO is used, the receiving signal processing unit 200 may use a spatial demapper for converting the Fourier transformed receiver chains to constellation points of the space-time streams and an STBC decoder for despreading the constellation points from the space-time streams into the spatial streams.

The demapper 240 demaps the constellation points output from the Fourier transformer 230 or the STBC decoder to bit streams. If LDPC encoding is used, the demapper 240 may further perform LDPC tone demapping before constellation demapping. The deinterleaver 250 deinterleaves the bits of each stream output from the demapper 240. Deinterleaving may be applied only when BCC encoding is used.

When MIMO or MU-MIMO is used, the receiving signal processing unit 200 may use a plurality of demappers 240 and a plurality of deinterleavers 250 corresponding to the number of spatial streams. In this case, the receiving signal processing unit 200 may further include a stream deparser for combining the streams output from the deinterleavers 250.

The decoder 260 decodes the streams output from the deinterleaver 250 or the stream deparser. For example, the decoder 260 may be an FEC decoder. The FEC decoder may include a BCC decoder or an LDPC decoder. The receiving signal processing unit 200 may further include a descrambler for descrambling the decoded data. If BCC decoding is used in the decoder 260, the receiving signal processing unit 200 may further include an encoder deparser for multiplexing the data decoded by a plurality of BCC decoders. If LDPC decoding is used in the decoder 260, the receiving signal processing unit 200 may not use the encoder deparser.

Figure 10:
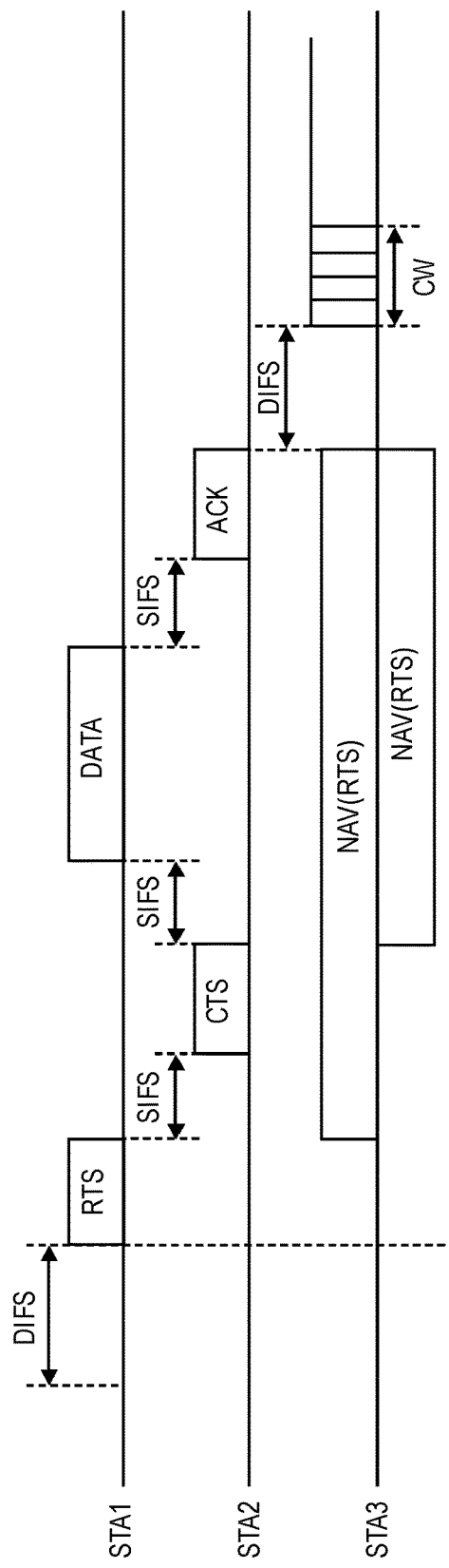
FIG. 10 is a timing diagram providing an example of the Carrier Sense Multiple Access/Collision Avoidance (CSMA/CA) transmission procedure, according to some embodiments.

FIG. 10 is a timing diagram providing an example of the Carrier Sense Multiple Access/Collision Avoidance (CSMA/CA) transmission procedure, according to some embodiments. In the illustrated example, STA1 is a transmit WLAN device for transmitting data, STA2 is a receive WLAN device for receiving the data, and STA3 is a WLAN device, which may be located at an area where a frame transmitted from the STA1 and/or a frame transmitted from the STA2 can be received by the WLAN device.

STA1 may determine whether the channel is busy by carrier sensing. The STA1 may determine the channel occupation based on a quality of the signal on the channel or correlation of signals in the channel, or may determine the channel occupation by using a network allocation vector (NAV) timer.

When determining that the channel is not used by other devices during DIFS (that is, the channel is idle), STA1 may transmit an RTS frame to STA2 after performing backoff. Upon receiving the RTS frame, STA2 may transmit a CTS frame as a response of the CTS frame after SIFS. When STA3 receives the RTS frame, it may set the NAV timer for a transmission duration of subsequently transmitted frames (for example, a duration of SIFS+CTS frame duration+

SIFS+data frame duration+SIFS+ACK frame duration) by using duration information included in the RTS frame. When STA3 receives the CTS frame, it may set the NAV timer for a transmission duration of subsequently transmitted frames (for example, a duration of SIFS+data frame duration+ SIFS+ACK frame duration) by using duration information included in the RTS frame. Upon receiving a new frame before the NAV timer expires, STA3 may update the NAV timer by using duration information included in the new frame. STA3 does not attempt to access the channel until the NAV timer expires.

When STA1 receives the CTS frame from the STA2, it may transmit a data frame to the STA2 after SIFS elapses from a time when the CTS frame has been completely received. Upon successfully receiving the data frame, the STA2 may transmit an ACK frame as a response of the data frame after SIFS elapses.

When the NAV timer expires, STA3 may determine whether the channel is busy through the use of carrier sensing techniques. Upon determining that the channel is not used by other devices during DIFS and after the NAV timer has expired, STA3 may attempt channel access after a contention window according to random backoff elapses.

The solutions provided herein have been described with reference to a wireless LAN system; however, it should be understood that these solutions are also applicable to other network environments, such as cellular telecommunication networks, wired networks, and similar communication networks.

An embodiment of the invention may be an article of manufacture in which a non-transitory machine-readable medium (such as microelectronic memory) has stored thereon instructions which program one or more data processing components (generically referred to here as a "processor") to perform the operations described above. In other embodiments, some of these operations might be performed by specific hardware components that contain hardwired logic (e.g., dedicated digital filter blocks and state machines). Those operations might alternatively be performed by any combination of programmed data processing components and fixed hardwired circuit components.

Some portions of the preceding detailed descriptions have been presented in terms of algorithms and symbolic representations of operations on data bits within a computer memory. These algorithmic descriptions and representations are the ways used by those skilled in conferencing technology to most effectively convey the substance of their work to others skilled in the art. An algorithm is here, and generally, conceived to be a self-consistent sequence of operations leading to a desired result. The operations are those requiring physical manipulations of physical quantities. It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a conference device, or similar electronic computing device, that manipulates and transforms data represented as physical (electronic) quantities within the conference device's registers and memories into other data similarly represented as physical quantities within the conference device's memories or registers or other such information storage, transmission or display devices.

While the flow diagrams in the figures herein show a particular order of operations performed by certain embodiments of the invention, it should be understood that such order is exemplary (e.g., alternative embodiments may perform the operations in a different order, combine certain operations, overlap certain operations, etc.).

While the invention has been described in terms of several embodiments, those skilled in the art will recognize that the invention is not limited to the embodiments described, can be practiced with modification and alteration within the spirit and scope of the appended claims. The description is thus to be regarded as illustrative instead of limiting.

What is claimed is:

1. A station (STA) in a Wireless Local Area Network (WLAN) for transmitting a frame to an Access Point (AP) as part of an uplink multi-user simultaneous transmission while avoiding an occurrence of unintentional beamforming at the AP, the STA comprising:
   a baseband processor to generate an uplink frame having a common part and a user-specific part, wherein the uplink frame is to be transmitted simultaneously with frames generated by one or more other STAs according to scheduling information and wherein generating the uplink frame includes applying a first cyclic shift value to the common part of the uplink frame, wherein the first cyclic shift value is different from one or more second cyclic shift values to be applied by each of the one or more other STAs; and
   a radio frequency transceiver to transmit the uplink frame to the AP through a wireless medium.

2. The STA of claim 1, wherein the first cyclic shift value is determined based on the scheduling information included in a downlink frame.

3. The STA of claim 2, wherein the first cyclic shift value is determined based on a scheduling order of the STA in the scheduling information, wherein the scheduling order of the STA indicates which frequency resource or spatial stream the STA is assigned to use for transmission.

4. The STA of claim 2, wherein the downlink frame includes an explicit indication of the first cyclic shift value that is assigned to the STA.

5. The STA of claim 1, wherein the first cyclic shift value is determined based on randomness.

6. The STA of claim 5, wherein the first cyclic shift value is randomly selected from a predetermined range of values.

7. The STA of claim 1, wherein the STA has a plurality of transmit chains, and wherein a first transmit chain of the plurality of transmit chains is assigned the first cyclic shift value and a second transmit chain of the plurality of transmit chains is assigned a third cyclic shift value that is different from the first cyclic shift value assigned to the first transmit chain.

8. The STA of claim 7, wherein the third cyclic shift value assigned to the second transmit chain is a pre-determined offset from the first cyclic shift value assigned to the first transmit chain.

9. A non-transitory machine-readable medium having stored therein instructions which, when executed by a processor of a station (STA), cause the STA to:
   generate an uplink frame having a common part and a user-specific part, wherein the uplink frame is to be transmitted simultaneously with frames generated by one or more other STAs according to scheduling information and wherein generating the uplink frame includes applying a first cyclic shift value to the common part of the uplink frame, wherein the first cyclic shift value is different from one or more second cyclic shift values to be applied by each of the one or more other STAs; and transmit the uplink frame to the AP through a wireless medium.

10. The non-transitory machine-readable medium of claim 9, wherein the first cyclic shift value is determined based on the scheduling information included in a downlink frame.

11. The non-transitory machine-readable medium of claim 10, wherein the first cyclic shift value is determined based on a scheduling order of the STA in the scheduling information, wherein the scheduling order of the STA indicates which frequency resource or spatial stream the STA is assigned to use for transmission.

12. The non-transitory machine-readable medium of claim 10, wherein the downlink frame includes an explicit indication of the first cyclic shift value that is assigned to the STA.

13. The non-transitory machine-readable medium of claim 9, wherein the first cyclic shift value is determined based on randomness.

14. The non-transitory machine-readable medium of claim 13, wherein the first cyclic shift value is randomly selected from a predetermined range of values.

15. The non-transitory machine-readable medium of claim 9, wherein the STA has a plurality of transmit chains, and wherein a first transmit chain of the plurality of transmit chains is assigned the first cyclic shift value and a second transmit chain of the plurality of transmit chains is assigned a third cyclic shift value that is different from the first cyclic shift value assigned to the first transmit chain.

16. The non-transitory machine-readable medium of claim 15, wherein the third cyclic shift value assigned to the second transmit chain is a pre-determined offset from the first cyclic shift value assigned to the first transmit chain.

* * * * *